United States Patent [19]

Golobay

[11] 4,274,300

[45] Jun. 23, 1981

[54] APPARATUS FOR AUTOMATICALLY MAINTAINING THE TAUTNESS OF A MECHANICAL COUPLING BETWEEN AN ACTUATABLE DEVICE AND AN ASSOCIATED ACTUATING MECHANISM

[75] Inventor: Gary L. Golobay, Augusta, Kans.

[73] Assignee: Conchemco, Incorporated, Lenexa, Kans.

[21] Appl. No.: 77,989

[22] Filed: Sep. 24, 1979

[51] Int. Cl.³ .......................... F16C 1/22; F16D 65/44
[52] U.S. Cl. ............................ 74/501.5 R; 188/196 R; 188/196 B; 188/202
[58] Field of Search ................... 74/501.5; 188/196 R, 188/196 B, 200, 202, 196 BA; 246/152

[56] References Cited

U.S. PATENT DOCUMENTS

| | | | |
|---|---|---|---|
| 711,750 | 10/1902 | Wilson | 188/203 |
| 1,477,891 | 12/1923 | Osborn | 188/202 |
| 1,590,502 | 6/1926 | Djurson | 188/202 |
| 1,592,969 | 7/1926 | De Camp | 188/202 |
| 1,811,913 | 6/1931 | Browall | 188/202 |
| 1,837,473 | 12/1931 | Neveu | 188/202 |

*Primary Examiner*—Kenneth Dorner

*Attorney, Agent, or Firm*—Schmidt, Johnson, Hovey & Williams

[57] ABSTRACT

Apparatus of increased simplicity, reliability and economy is provided for automatically maintaining the tautness of a mechanical coupling such as commonly employed, for example, between a vehicular brake and its actuating mechanism, which would otherwise be subject to loosening during normal use as a result of wear or the like. The apparatus, although also utilizable with mechanical couplings employing rigid connecting links, is especially suited for use with couplings employing flexible cables or the like, wherein it need only be interposed in series with the cabling between the actuating mechanism and the device actuatable thereby, thereby adapting the apparatus for use in a variety of applications in which control cable couplings are employed. The apparatus basically requires only an assembly having a threadably intercoupled element and member mounted for reciprocation by the associated cabling or linkages, with the element being restrained against rotation and the member being rotatable and provided with a unique arrangement of rotary cam surfaces continuously engaged by a follower pin whose position is fixed relative to the reciprocable movement of the assembly and the rotatability of the member.

8 Claims, 7 Drawing Figures

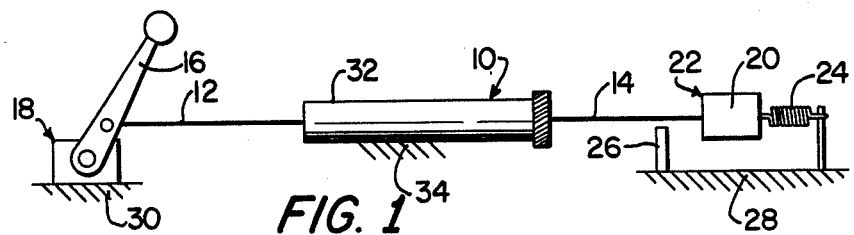
FIG. 1
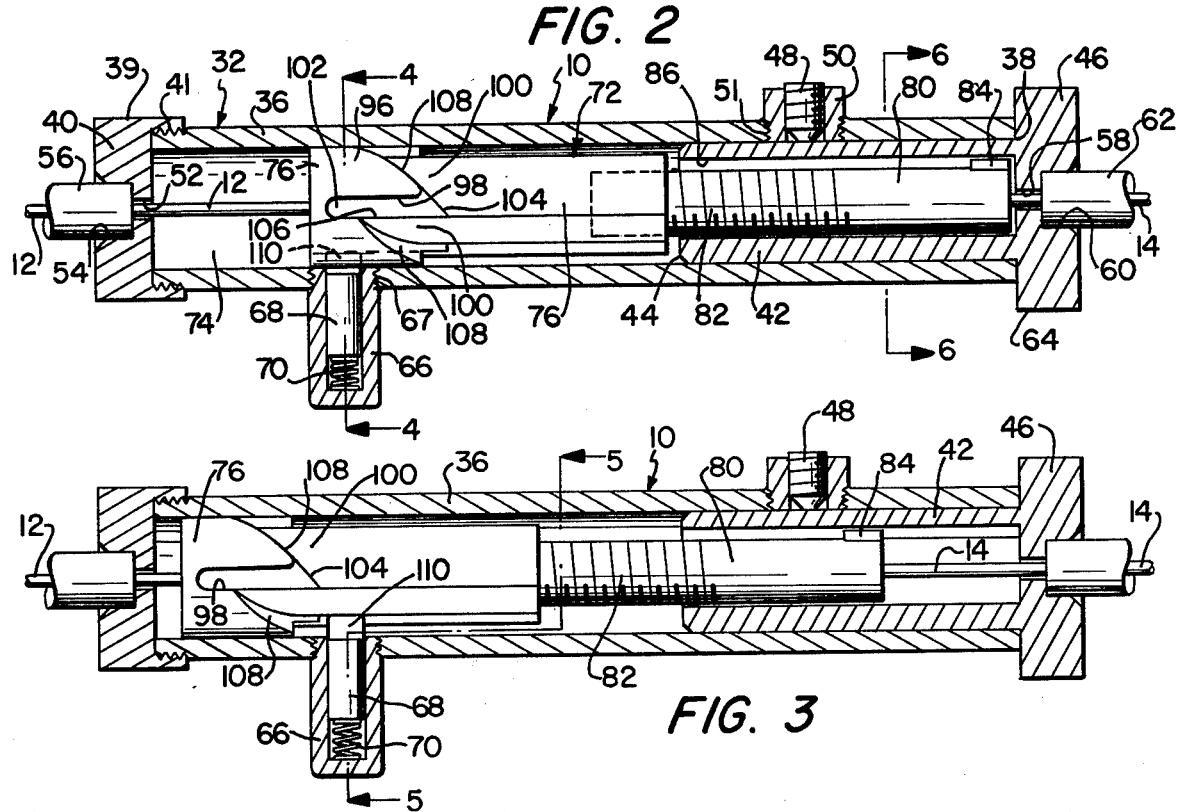
FIG. 2
FIG. 3
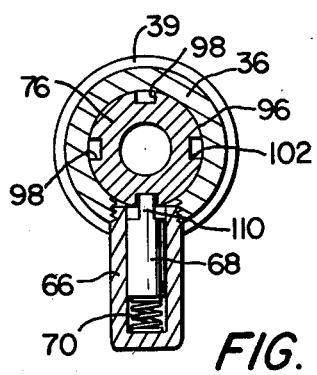
FIG. 4
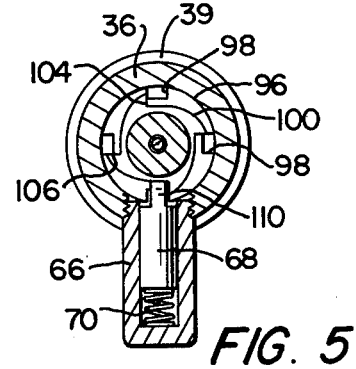
FIG. 5
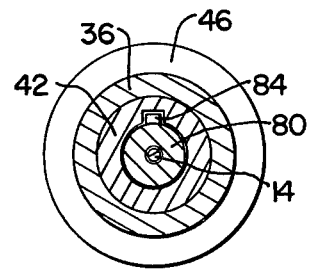
FIG. 6
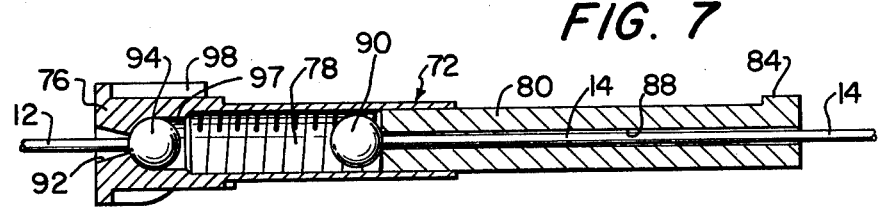
FIG. 7

APPARATUS FOR AUTOMATICALLY MAINTAINING THE TAUTNESS OF A MECHANICAL COUPLING BETWEEN AN ACTUATABLE DEVICE AND AN ASSOCIATED ACTUATING MECHANISM

BACKGROUND OF THE INVENTION

1. Field of the Invention

This invention relates to mechanical couplings such as utilized to operably couple an actuatable device having a shiftable component with the shiftable part of an actuating mechanism spaced from the device. More particularly, the invention is concerned with providing improved apparatus for maintaining the tautness of such couplings under usage conditions involving wear or aging effects that would otherwise tend to loosen or create undesirable "slack" in the coupling. Apparatus of the general class involved have sometimes been referred to as "slack adjuster" or "slack take-up" devices.

2. Description of the Prior Art

Known prior devices of the same general class include those proposed in U.S. Pat. Nos. 711,750 (Wilson), 1,477,891 (Osborn), 1,590,502 (Djurson), 1,592,969 (DeCamp), 1,811,913 (Browall), and 1,837,473 (Neven). The state of the art represented by such prior patents is believed characterized by a number of limiting factors and general rationale incompatible with providing a general purpose device that would be reliable yet sufficiently small, economical and versatile to be used in diverse applications such as in ordinary bicycle brakes. The noted prior devices were apparently intended for utilization primarily or exclusively in massive systems such as railroad air brake equipment, are essentially built into a fluid cylinder actuator or otherwise configured to form a part of a rigid linkage system, are inherently ill-adapted for use in many cable coupled systems, and are relatively heavy, complex, expensive to manufacture and of nature likely to require considerable maintenance. Such prior art further seems to manifest a focusing of primary innovative effort upon the matter of preventing retrograde movement of the turnbuckle components, resulting in its resort both to various forms of unnecessary ratchet mechanisms and to relatedly special or aberrated forms of turnbuckle components apparently intended to accommodate to the particular form of ratchet mechanism proposed, which is a problem solved more straight-forwardly by this invention through a construction that simply precludes such retrograde motion with the same components that provide the desired intermittent take-up motion.

SUMMARY OF THE INVENTION

The apparatus of this invention is as effective and versatile, as it is simple and inexpensive to fabricate and install. It is compact, light and adapted for use in either cable or rigid link coupling systems, may be constructed in various sizes to suit diverse applications, and employs a minimum number of working parts. The primary components of the apparatus, which may be interposed in series anywhere within the coupling path of the cabling or rigid link system connecting an actuatable device with its actuating mechanism, include only a sleeve-like, fixed housing structure, an assembly reciprocably received within the housing and comprising a generally cylindrical element axially connected by a simple screw coupling with a generally cylindrical member provided with appropriate external camming surfaces, means such as a key and slot for holding the element against rotation relative to the housing during reciprocation of the assembly, an inwardly biased follower pin carried by the housing and in continuous engagement with the camming surfaces on the member for rotating the latter to provide "slack take-up" as required in response to reciprocation of the assembly, and suitable means for connecting the remote extremities of the assembly in series interposed relationship within the mechanical coupling system in which the apparatus is to be employed. In a preferred embodiment, the means for restraining the element against rotation is releasable to permit convenient manual resetting of the threadably coupled relationship between the element and the member during initial installation or subsequent servicing without disassembly of the apparatus. The nature of the camming surfaces on the member, in cooperation with the follower pin in continuous engagement therewith, automatically accomplish both controlled intermittent rotation of the member to provide "slack take-up" when needed and prevent undesired retrograde rotation of the member. The apparatus is "reversible" relative to the orientation of the actuatable device and the actuating mechanism therefor at the opposite extremities of the mechanical coupling path therebetween, in order to permit "slack take-up" action of the apparatus to occur either during the "power stroke" of the actuating mechanism or the "return stroke" in which a spring or other biasing force associated with the actuatable device restores the entire system to an unactuated standby condition, the latter being deemed preferable in most applications.

BRIEF DESCRIPTION OF THE DRAWING

In the drawing:

FIG. 1 is a schematic diagram intended to indicate the general relationship of the apparatus of the invention to the other parts of a mechanically coupled system with which it may be utilized;

FIG. 2 is a view, partially in longitudinal cross-section and partially in elevation (as to the internal parts), showing the currently preferred form of such apparatus with the internal "take-up" assembly thereof in a standby position;

FIG. 3 is a view similar to FIG. 2, except with the "take-up" assembly of the apparatus in a shifted position for initiating "take-up" action;

FIG. 4 is a transverse cross-sectional view taken on line 4—4 of FIG. 2;

FIG. 5 is a transverse cross-sectional view taken on irregular line 5—5 of FIG. 3;

FIG. 6 is a transverse cross-sectional view taken on line 6—6 of FIG. 2; and

FIG. 7 is a view, partially in longitudinal cross-section and partially in elevation, on a smaller scale, showing the manner in which the cables forming a part of an associated, mechanically coupled system are secured to the internal "take-up" assembly of the apparatus.

DESCRIPTION OF THE PREFERRED EMBODIMENT

For purposes of illustrating the invention, the drawings depict and there will be described hereunder a preferred embodiment of the apparatus especially adapted for use in the mechanical coupling between an ordinary bicycle brake and the remotely located actuating lever therefor. It will be apparent to those skilled in the art, however, that the principles and even the general construction of the apparatus may be straight-forwardly adapted for other applications by appropriate modification of sizing and, if appropriate, substitution of suitable connections between the opposite extremities of the internal "take-up" assembly of the apparatus and rigid link type connecting rods or the like, which may be employed in some mechanical couplings instead of the flexible cables utilized in the preferred bicycle brake oriented embodiment.

Referring now to FIG. 1 of the drawing, the apparatus 10 of the invention is interposed in series with cable stretches (or coupling links) 12 and 14, which are respectively oppositely connected with a shiftable part 16 of an actuating mechanism 18 and a shiftable component 20 of an actuatable device 22. The actuatable device typically includes, besides the shiftable component 20, some biasing means such as a spring 24 for yieldably urging the shiftable component 20 in a direction away from the actuating mechanism 18 and further includes some form of stop means 26 representing the limit of travel of the shiftable component 20 toward the actuating mechanism 18 when the device 22 is actuated. In the context of the bicycle brake application with respect to which the preferred embodiment is being described, the shiftable component 20 would be the braking shoe which engages a disk, the braking clamp which engages a wheel rim of the bicycle or the like, the biasing means 24 would be the spring or springs normally associated with the braking parts of such a device, and the stop means 26 would represent the limit of travel of the component 20 when it is fully actuated into engagement with the disk, rim or the like. It will be apparent to those skilled in the art, however, that the device 22 could just as well be virtually any actuatable device having a shiftable component 20 and operational attributes analogous to those noted as to conventional bicycle brakes.

The actuating mechanism 18 for the device 22 may similarly be of virtually any character involving a shiftable part 16 that is controllably movable away from a standby position nearest to the device 22 to an actuating position exerting a pulling force through the mechanical coupling path provided by the coupling stretches 12 and 14 and, when the invention is applied thereto, also including the apparatus 10. The shiftable part 16 of the actuating mechanism is illustrated as being a simple lever such as typically employed on bicycles for operating the brake thereof, but manifestly could be operated by mechanical, fluid or electrical means rather than manual force as illustrated.

Although the mechanical coupling means 12–14 to which the apparatus is applied is illustrated in FIG. 1 as being disposed along a straight path, it will be understood that this is not essential to the utility of the apparatus 10, since the latter may be interposed in series with a mechanical coupling path that includes cables trained over guiding sheaves or compound rigid linkages.

It is well known that "slack" or looseness of the mechanical coupling may develop with continued use in such systems. Where the device 22 is in the nature of a brake, simple wear upon the brake force exerting surface of the shiftable component 20 will require that the component 20 be shifted through a longer distance toward the stop means 26 for full actuation of the device 22 than was the case when the device 22 was new, unless means are provided for "taking up the slack", such as by effectively shortening the mechanical coupling 12-10 -14 between the component 20 and the actuating part 16. In systems employing cables for the mechanical coupling stretches 12 and 14, continued usage will typically result in stretching of the cables, again requiring "slack take-up" if normal operation of the device 22 is to be maintained. Even in systems employing rigid links for the coupling stretches 12 and 14, wear resulting from continued usage may present a similar problem.

Before leaving FIG. 1, it should be further noted that the actuatable device 22 and its actuating mechanism 18 are typically located in fixed positions relative to each other by virtue of both being mounted upon a common base structure such as the frame of a bicycle, as indicated at 28 and 30. The outer housing structure 32 of the apparatus 10 is likewise fixedly mounted upon the same base or frame, as indicated at 34.

Referring next to FIG. 2, the housing structure 32 of the apparatus 10 includes an elongate, tubular, generally cylindrical, outer sleeve 36 having an open end 38 at the extremity thereof adjacent the actuatable device 22 and a cap 39 threadably mounted as at 41 on the sleeve 36 and providing for the latter an end wall 40 at the extremity thereof adjacent the actuating mechanism 18, together with an elongate, tubular, generally cylindrical, inner sleeve 42 having an open end 44 at the extremity thereof adjacent the mechanism 18 and a wall 46 at the extremity thereof adjacent the device 22. The inner sleeve 42 is received within the outer sleeve 36 and releasably held in place and against rotation with respect to the latter by suitable fastening means such as a set screw 48 threadably mounted in a lateral stud sleeve 50 in turn threadably mounted as at 51 on the outer sleeve 36. The end wall 40 of the outer sleeve 36 is provided with an opening 52 therethrough for free passage of the cable stretch 12, and the opening 52 is preferably enlarged as at 54 to receive the end portion of a guide sleeve 56 for the cable 12, which guide sleeve 56 may be generally flexible and of character to reduce friction for freer longitudinal movement of the cable 12. Similarly, the end wall 46 of the inner sleeve 42 is provided with an opening 58 therethrough for passing the cable 14, and the opening 58 may have an enlarged portion 60 for accommodating a guide sleeve 62 associated with the cable 14. The end wall 46 is preferably of greater diameter than the outer sleeve 32 and may have a knurled circumferential surface at 64 in order to facilitate manual adjusting rotation of the inner sleeve 42 relative to the outer sleeve 36 when the set screw 48 is loosened, for purposes hereinafter noted. The outer sleeve 36 is provided with a laterally extending, hollow extension 66 threadably mounted on the sleeve 36 as at 67 for receiving a cam follower pin and associated spring 70 for yieldably biasing the pin 68 radially inwardly. The apparatus 10 will be mounted in a fixed position along the mechanical coupling path between the actuating mechanism 18 and the actuatable device 22 by any suitable fastening means (indicated only schematically as at 34 in FIG. 1), which may, for example, comprise clamps (not shown) for attaching the outer sleeve 36 to a frame member of a bicycle.

Referring next to FIG. 7 in conjunction with FIG. 2, a reciprocal assembly 72 is disposed partially within the outer sleeve 36 and partially within the inner sleeve 42. The portion of the assembly 72 within the chamber 74 is in the nature of a generally cylindrical member 76 having an internally threaded bore 78 and external cam surfaces and other features to be hereinafter described. The portion of the assembly 72 extending into the inner sleeve 42 is in the nature of an elongate, generally cylindrical element 80 having an externally threaded screw surface as at 82 extending into and threadably coupled with the internally threaded bore 78 of the member 76. It will be appreciated, therefore, that the overall length of the assembly 72 is dependent upon the extent to which the screw portion 82 of the element 80 is received within the threaded bore 78 of the member 76, which can be altered by relative rotation of the member 76 with respect to the element 80. The element 80 is provided with a radially outwardly extending key projection 84 that is reciprocably received within a key slot 86 formed in the inner surface of the inner sleeve 42, which permits free reciprocable movement of the element 80 with respect to the inner sleeve 42 and the housing structure 32 but prevents the element 80 from rotating relative to the latter when the set screw 48 is holding the inner sleeve 42 within the outer sleeve 36, as will be the case during normal operation.

The cable 14 may be interconnected to the element 80 in any suitable fashion, and, in the preferred construction illustrated, the cable 14 is passed through an axial bore 88 in the element 80 and terminated in a ball-like holder 90, it being noted that this construction tends to prevent possible twisting of the cable 14 during adjusting rotation of the element 80 which may occur during initial installation or servicing as hereinafter described. Similarly, the cable 12 may be secured to the member 76 by passing the cable 12 through an opening 92 in the end of the member 76 opposite the element 80 and securing to the end of such cable 12 a ball-like holder 94 disposed within a suitable cavity 97 within the member 76, it being noted that this preferred construction will tend to prevent twisting of the cable during rotation of the member 76 for "slack take-up" purposes as further hereinafter described.

The cam surfaces on the member 76 which cooperate with the radially inwardly biased cam follower pin 68 are best seen in FIGS. 2–5 and include an outermost, generally cylindrical surface 96 of diameter guiding the member 76 for free reciprocal movement within the outer sleeve 36 of the housing structure 32, a plurality of grooves 98 (of which four are employed in the preferred construction) spaced at uniform intervals around the circumference of the surface 96, and a plurality of transition surfaces 100 extending generally between portions of the member 76 between adjacent grooves 98. The grooves 98 extend longitudinally of the member 76, are preferably closed at the end thereof remote from the element 80 and are open at the end thereof adjacent the element 80. The depth of each of the grooves 98 is such that the bottom 102 thereof is disposed radially inwardly from the level of the outer surface 96. The portion of each of the transition surfaces 100 adjacent the open end of one of the adjacent grooves 98 between which it extends is of a still greater radial depth and is separated from the latter by a drop-off wall 104 adjacent the open end of such groove 98. Each transition surface 100 extends circumferentially from the portion thereof adjacent the drop-off wall 104 in ramp-like fashion toward the adjacent groove 98 where it communicates laterally with the latter over a drop-off wall 106. The drop-off wall 104, whose plane is generally radial, extends spirally around the circumference of the member 76 and back toward an intermediate point of the adjacent groove 98 as at 108. The length of each of the grooves 98 between its closed end and the associated drop-off wall 104 communicating its open end with the corresponding transition surface 100 is predetermined in design for each intended application of the apparatus 10 according to the desired normal extent of reciprocable movement of the shiftable component 20 of the actuatable device 22 from its unactuated position to the limiting position thereof when in its actuated condition represented by the stop means 26.

As illustrated in FIGS. 2 and 4, the follower projection 110 upon the inner end of the cam follower pin 68 is biased by the spring 70 into one of the grooves 98 and will remain within the lateral confinement of such groove 98 during normal reciprocation of the assembly 72 (from the position illustrated in FIG. 2 to an actuated position thereof displaced to the left, but less so than depicted in FIG. 3), as will occur during normal operation of the shiftable part 16 of the actuating mechanism 18 to actuate the device 22, as long as there remains no undesired "slack" in the mechanical coupling system represented by the cables 12 and 14 with the apparatus 10 interposed in series therewith. However, presuming that "slack" has occurred in the overall system (say, for example, due to wearing away of the surface of the shiftable component 20 of the actuatable device 22 which would normally limit the "power stroke" of the system by engagement with the stop means 26), then, as illustrated in FIGS. 3 and 5, as such "power stroke" proceeds, the member 76 will move (leftwardly in the drawing) a sufficient distance that the projection 110 on the follower pin 68 will have passed out of the open end of the groove 98 and over the corresponding drop-off wall 104 so as to be resting upon the adjacent portion of the corresponding transition surface 100. In that condition, when the shiftable part 16 of the actuating mechanism 18 is relieved of the actuating force applied thereto during the "power stroke", the mechanical coupling including the cables 12 and 14 and the assembly 72 of the apparatus 10 will shift back to the right, as shown in FIGS. 2 and 3, under the urging influence of the biasing force present in the overall system and typically incorporated into the actuatable device 22 in the form of spring means 24. During such "return stroke", the projection 110 of the follower pin will be engaging the spiral surface of the drop-off wall 104 and its extension 108, as well as radially engaging the corresponding transition surface 100, which will cause the member 76 to rotate in a direction for "taking-up" more of the screw portion 82 of the element 80, thereby shortening the assembly 72 and exerting a tightening effect upon the overall mechanical coupling 12–10–14 between the actuatable device 22 and its actuating mechanism 18. As such rotation of the member 76 proceeds during the "return stroke" of the overall system, the follower pin 68 will be gradually shifted radially outwardly by virtue of the radial engagement of its projection 110 with the circumferentially outwardly inclined or ramped transition surface 100, until such projection 110 passes over the corresponding drop-off wall 106 and into the next adjacent groove 98, whereupon the engagement of the projection 110 with the wall of the last-mentioned groove 98 terminates that cycle of rotation and "take-up" action of the member 76. If sufficient "slack" has been removed from the overall mechanical coupling system by a single such quarter-rotation of the member 76, as will usually be typical since the apparatus 10 operates to continually maintain the system free of undesired "slack", then immediately subsequent actuations of the device 22 will proceed with the projection 110 of the cam follower pin 68 remaining within the same groove 98, unless and until the development of further "slack" in the system again causes the projection 110 to pass over the drop-off wall 104 at the open end of the groove 98 in which it has been operating to thereby repeat the tightening or "slack take up" cycle. Of course, if an initial quarter-rotation of the member 76 is insufficient to "take up" a "slack" condition which has developed, the described rotational cycling of the member 76 will continue until all undesired "slack" has been removed from the system during succeeding actuations of device 22.

During initial installation or especially during servicing, such as when a worn brake pad may be replaced upon the shiftable component 20 of the actuatable device 22, it may be necessary to "un-screw" the screw portion 82 of the element 80 from the internally rotated bore 78 of the member 76 to provide for resetting of the proper length of the mechanical coupling 12-10-14 and a maximum capacity of the apparatus 10 for subsequently "taking up" such further "slack" as may later develop in the system. Although that need could be accommodated by so constructing the apparatus 10 that it could be disassembled for such purpose, the provision of the inner sleeve 42 with its releasable set screw 48 has been found more convenient, and it will be apparent that, upon loosening of the set screw 48 during servicing, the wall 46 of the inner sleeve 42 may be employed as a knob for rotating the element 80 in a retrograde direction to "un-screw" the threaded portion 82 of the element 80 from the member 76 to whatever degree might be desired, whereupon the set screw 48 may be re-tightened. Conversely, if during initial installation it may be desired to initially "tighten" the mechanical coupling 12-10-14, this also may be conveniently done by appropriate rotational movement of the inner sleeve 42 to "screw" the screw portion 82 of the element 80 further into the member 76, although the apparatus 10 itself will, of course, automatically attend to any required initial "tightening" that may be required during the first few actuations of the device 22, if the particular application will permit handling the matter of bringing the mechanical coupling system into desired initial condition in that fashion.

Those skilled in the art will appreciate that, although the invention has been illustrated by depiction in the drawings and description of an embodiment currently preferred for use in a bicycle brake operating application, the principles of the invention are susceptible to a much broader range of application, either with the apparatus 10 essentially as depicted and described or with its construction or relationship to the remainder of the overall system modified only in relatively minor fashion. For example, if desired for any reason, the member 76 could have been disposed on the right and the element 80 disposed on the left as shown in FIGS. 2 and 3, with the operation of the apparatus 10 remaining essentially the same; or, if it be desired that "slack take-up" action of the apparatus 10 occur during the "power stroke" of the system, rather than during the "return stroke" thereof as described for illustration, either the constructional orientation or the overall physical orientation of the apparatus 10 may be simply reversed from that shown and described for illustration. It will also be apparent that, since merely proper design choice of the length of the groove 98 is involved, the apparatus 10 may be adapted for systems in which the extent of reciprocation of the mechanical coupling 12-10-14 is either relatively greater or smaller than the particular construction illustrated. Still other modifications such as providing a different number of grooves 98 around the circumference of the member 76 may be employed, for example, in an application where it might be desired that the "slack take-up" action occur at a relatively faster or slower rate with reference to each actuation of the device 22.

Accordingly, it is to be understood that the invention should fairly be deemed limited only by the scope of the claims which follow, and that the latter should properly be construed as encompassing mechanical equivalents incorporating the simple, economical and effective structural features and relationships which are the gist of the invention.

I claim:

1. In apparatus for automatically maintaining the tautness of mechanical coupling means extending between and oppositely coupled with a shiftable component of an actuatable device and a shiftable part of an actuating mechanism operably associated with said device and disposed in spaced relationship to said device, wherein said component is normally urged generally away from said mechanism and into an unactuated position thereof but is movable from said unactuated position generally toward said mechanism and into an actuated position thereof in response to application thereto of a force directed generally toward said mechanism, and wherein said part has a standby position relatively nearest said device but is movable from said standby position generally away from said device and into an actuating position thereof for applying said force to said component to actuate said device:
   structure disposed generally between said device and said mechanism and in fixed relationship thereto;
   a shiftable element disposed generally between said device and said mechanism;
   motion restricting means operably coupling said structure with said element for restraining said element against rotation about an axis extending generally along at least a portion of the path of extension of said mechanical coupling means between said device and said mechanism, said element being reciprocable along said axis;
   a shiftable member disposed generally between said device and said mechanism and along said axis, said member being both rotatable about said axis and reciprocable along said axis;
   threaded connecting means operably intercoupling said element and said member along said axis for reciprocation of said element and said member together as a single assembly along said axis and for automatically drawing the remote extremities of said assembly of said element and said member disposed along said axis closer to each other when said member is rotated about said axis in one direction relative to said element;
   cooperating rotary cam and follower means having continuously interengaged cam and follower parts operably intercoupling said member and said structure for rotating said member about said axis in said one direction relative to said element when said assembly is reciprocated back and forth along said axis through a distance greater than a predetermined range of desired reciprocation thereof; and
   means for operably intercoupling said assembly in series interposed relationship within said mechanical coupling means between said component of said actuating device and said part of said actuating mechanism.

2. The invention of claim 1, wherein:

said cam and follower means includes cam surfaces on said member, and a follower pin carried by said structure.

3. The invention of claim 2, wherein:

said member is generally cylindrical and has its axis of revolution disposed generally along said said portion of said path of extension of said mechanical coupling means, said follower pin is urged toward said member generally radially inwardly with respect to the latter, and said cam surfaces include at least one groove of a first radial depth adapted to receive said follower pin, extending generally parallel to the path of reciprocation of said assembly and having an open extremity, a transition surface which is of a second radial depth greater than said first depth adjacent said open extremity of said one groove and extends from the latter in a generally circumferential direction relative to said member, a first generally radial drop-off wall surface beyond said open extremity of said one groove across which the latter is communicated with said transition surface, and a generally radial wall extension of said drop-off wall surface extending generally spirally with respect to said member, in said circumferential direction and back in the general direction of a circumferential zone of said member displaced toward the other extremity of said one groove.

4. The invention of claim 3, wherein:

there are a plurality of said grooves spaced circumferentially about said member and each having associated therewith a corresponding first drop-off wall surface, transition surface and drop-off wall surface extension.

5. The invention of claim 4, wherein:

each of said transition surfaces is outwardly inclined in circumferentially ramped fashion as it extends from its zone of communication with the open extremity of its associated groove toward a next adjacent groove, is of a third radial depth less than said first radial depth at a zone of communication thereof with said adjacent groove, and is communicated with the latter across a generally radial second drop-off wall surface between said transition surface and a portion of said adjacent groove.

6. The invention of either of claim 1, claim 2, claim 3, claim 4 or claim 5, wherein:

said mechanical coupling means includes a flexible stretch extending between said assembly and at least one of said device and said mechanism along said path of extension of said mechanical coupling means.

7. The invention of either of claim 1, claim 2, claim 3, claim 4 or claim 5, wherein:

said open extremity of said one groove is closer to said device along said path of extension of said mechanical coupling means than the opposite extremity of said groove.

8. The invention of either of claim 1, claim 2, claim 3, claim 4 or claim 5, wherein:

said restricting means is selectively releasable to permit rotation of said element relative to said member for adjusting the distance between the remote extremities of said assembly during installation or servicing.

* * * * *